United States Patent
Chen et al.

(10) Patent No.: US 12,120,656 B2
(45) Date of Patent: *Oct. 15, 2024

(54) BEAM FAILURE RECOVERY METHOD AND DEVICE

(71) Applicant: VIVO MOBILE COMMUNICATION CO., LTD., Guangdong (CN)

(72) Inventors: Li Chen, Chang'an Dongguan (CN); Yumin Wu, Chang'an Dongguan (CN); Jing Liang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/945,991

(22) Filed: Sep. 15, 2022

(65) Prior Publication Data
US 2023/0007646 A1 Jan. 5, 2023

Related U.S. Application Data

(63) Continuation of application No. 16/969,512, filed as application No. PCT/CN2019/074175 on Jan. 31, 2019, now Pat. No. 11,483,833.

(30) Foreign Application Priority Data

Feb. 12, 2018 (CN) .......................... 201810147514.8

(51) Int. Cl.
*H04W 72/044* (2023.01)
*H04W 72/54* (2023.01)
*H04W 72/563* (2023.01)
*H04W 74/00* (2009.01)

(52) U.S. Cl.
CPC ......... *H04W 72/046* (2013.01); *H04W 72/54* (2023.01); *H04W 72/563* (2023.01); *H04W 74/006* (2013.01); *H04W 74/008* (2013.01)

(58) Field of Classification Search
None
See application file for complete search history.

(56) References Cited

U.S. PATENT DOCUMENTS

| | | | |
|---|---|---|---|
| 11,483,833 B2 * | 10/2022 | Chen | H04W 74/008 |
| 2019/0159100 A1 * | 5/2019 | Liou | H04B 7/088 |
| 2019/0200248 A1 * | 6/2019 | Basu Mallick | H04B 7/088 |
| 2019/0280756 A1 * | 9/2019 | Fan | H04W 74/02 |
| 2020/0154467 A1 | 5/2020 | Gong et al. | |
| 2020/0367293 A1 * | 11/2020 | Zhang | H04W 76/19 |

(Continued)

OTHER PUBLICATIONS

US Office Action in U.S. Appl. No. 16/969,512 Dated Jan. 25, 2022.
(Continued)

*Primary Examiner* — Mohammad S Adhami
(74) *Attorney, Agent, or Firm* — Brooks Kushman P.C.

(57) ABSTRACT

A beam failure recovery method and device are provided. The method includes: after a beam failure recovery event is triggered, user equipment (UE) monitoring a physical downlink control channel (PDCCH) scrambled with a cell radio network temporary identifier (C-RNTI) in a first control channel resource set (CORESET) for beam failure recovery, and monitoring a PDCCH scrambled with a C-RNTI in a second CORESET.

15 Claims, 7 Drawing Sheets

(56) References Cited

U.S. PATENT DOCUMENTS

2021/0068162 A1* 3/2021 Agiwal .............. H04L 41/0668

OTHER PUBLICATIONS

"Discussion on beam recovery" 3GPP TSG RAN WG1 Meeting #91, ZTE, Sanechips, R1-1719534, Nov. 27, 2017.
"Offline summary on remaining issues on Beam Failure Recovery" 3GPP TSG RAN WG1 Meeting #91, MediaTek Inc., R1-1721645, Nov. 27, 2017.
"Remaining details on beam recovery" 3GPP TSG RAN WG1 Meeting AH 1801, ZTE, Sanechips, R1-1800111, Jan. 22, 2018.
"Issues on beam failure recovery" 3GPP TSG RAN WG1 Meeting AH 1801, Samsung, R1-1800434, Jan. 22, 2018.
Written Opinion and International Search Report in Application No. PCT/CN2019/074175 Dated Mar. 18, 2019.

* cited by examiner

US 12,120,656 B2

BEAM FAILURE RECOVERY METHOD AND DEVICE

CROSS-REFERENCE TO RELATED APPLICATION

The present application is a continuation application of U.S. patent application Ser. No. 16/969,512 filed on Aug. 12, 2020, the U.S. patent Application is a U.S. national phase application of a PCT Application No. PCT/CN2019/074175 filed on Jan. 31, 2019, which claims a priority to Chinese Patent Application No. 201810147514.8 filed in China, on Feb. 12, 2018, disclosures of which are incorporated in their entireties by reference herein.

TECHNICAL FIELD

The present disclosure relates to the field of telecommunication technology, in particular to a beam failure recovery method and device.

BACKGROUND

In the related art, after a beam failure is triggered, user equipment (UE) no longer monitors a beam or a control channel resource set (CORESET) of reference signal (RS) corresponding to the beam, except for a candidate beam or an RS resource corresponding to the candidate beam, for a cell radio network temporary identifier (C-RNTI).

SUMMARY

An objective of some embodiments of the present disclosure is to provide a beam failure recovery method and device, to resolve the problem as to whether UE needs to monitor a physical downlink control channel (PDCCH) scrambled with a C-RNTI in a specified CORESET in a beam failure recovery procedure.

In a first aspect, a beam failure recovery method is provided, including:
  after a beam failure recovery event is triggered, user equipment (UE) monitoring a physical downlink control channel (PDCCH) scrambled with a cell radio network temporary identifier (C-RNTI) in a first control channel resource set (CORESET) for beam failure recovery, and monitoring a PDCCH scrambled with a C-RNTI in a second CORESET.

In a second aspect, UE is further provided, including: a processor, a storage, and a computer program stored in the storage and configured to be executed by the processor, where the processor is configured to execute the computer program to implement the steps in the foregoing beam failure recovery method.

In a third aspect, a non-transitory computer-readable storage medium storing therein a computer program is further provided, where the computer program is configured to be executed by a processor to implement the steps in the foregoing beam failure recovery method.

BRIEF DESCRIPTION OF THE DRAWINGS

Various other advantages and benefits will become more obvious to persons of ordinary skill in the art by reading detailed description of the following optional implementations. The accompanying drawings are only used for describing the optional implementations, and should not be considered as a limitation on the present disclosure. The same reference numerals represent the same components throughout the accompanying drawings. In the accompanying drawings.

DETAILED DESCRIPTION

Figure 1:
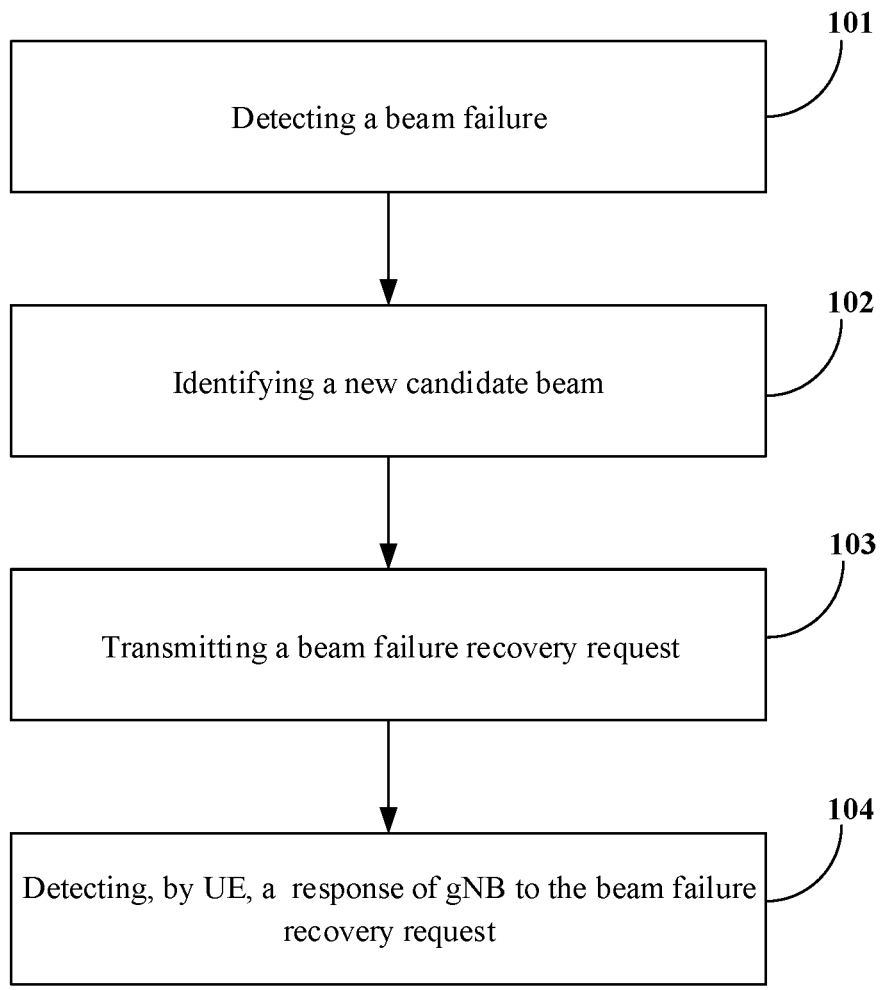
FIG. 1 is a schematic diagram of a beam failure recovery method of UE in the related art.

The following clearly and completely describes the technical solutions in some embodiments of the present disclosure with reference to the accompanying drawings in some embodiments of the present disclosure. Apparently, the described embodiments are merely some rather than all of the embodiments of the present disclosure. All other embodiments obtained by persons of ordinary skill in the art based on the embodiments of the present disclosure without creative efforts fall within the scope of the present disclosure.

The term "include" or "comprise" or any variation thereof in the description and claims of the present application is intended to encompass a non-exclusive inclusion. For example, a procedure, method, system, product or device that includes a series of steps or units is not necessarily limited to those steps or units specified expressly, rather, may include other steps or units that are not specified expressly or are inherent to the procedure, method, system, product or device. In addition, the term "and/or" used in the description and claims represents at least one of associated objects. For example, A and/or B represents the following three cases: only A exists, only B exists, and both A and B exist.

In some embodiments of the present disclosure, the terms such as "for example" are used to represent examples, illustrations or descriptions. In some embodiments of the present disclosure, any embodiment or design scheme limited with "for example" should not be construed to be more preferred than or superior over other embodiments or design schemes. Rather, the terms such as "for example" are used to specifically present related concepts.

In a future fifth-generation (5G) mobile communication system, to achieve the objective of a downlink transmission rate of 20 Gbps and an uplink transmission rate of 10 Gbps, high-frequency communication and massive multiple input multiple output (MIMO) technologies will be adopted. The high-frequency communication may provide a wider system bandwidth, and a smaller antenna size which further facilitates the deployment of massive MIMO in base station and UE. The high-frequency communication has disadvantages such as relatively high path loss, poor interference immunity, and frail link. The massive MIMO technology can provide relatively high antenna gain. Therefore, the combination of the high-frequency communication and the massive MIMO technology becomes the inexorable trend of a future 5G mobile communication system. However, the massive MIMO technology cannot resolve all problems in the high-frequency communication, for example, link fragility. When an obstacle is encountered in the high-frequency communication, a beam failure recovery mechanism can quickly switch beams, that is, switch a communication link from a poor-quality beam to a desirable beam, to avoid a radio link failure, thereby effectively improving the link robustness.

In the meeting of the 3rd Generation Partnership Project (3GPP) Radio Access Network (RAN) 1, the following conclusion about a beam failure recovery mechanism of UE is reached.

Referring to FIG. 1, FIG. 1 shows specific steps of the beam failure recovery mechanism of UE as follows:

A Step 101: detecting a beam failure;

A Step 102: identifying a new candidate beam;

A Step 103: transmitting a beam failure recovery request;

A Step 104: monitoring, by the UE, a response of next-generation node base station (gNB) to the beam failure recovery request.

It needs to be noted that the identification of a new candidate beam may be performed before or after the detection of the beam failure.

In the 3GPP RAN1 meeting, the following conclusion about the transmission of a beam failure recovery request by UE is reached:

The transmission of a beam failure recovery request on a contention-free physical random access channel (PRACH) is supported. A PRACH resource used for transmitting a beam failure recovery request is orthogonal to resources of regular PRACHs, at least for the frequency division multiplexing (FDM) case;

Other ways of achieving orthogonality, e.g., code division multiplexing (CDM) or time division multiplexing (TDM) are for future study;

Whether or not to adopt different sequence or format is for future study;

Whether or not the retransmission of a beam failure recovery request is similar to regular PRACH retransmission is for future study;

The transmission of a beam failure recovery request on a physical uplink control channel (PUCCH) is supported;

Whether or not a PUCCH is transmitted with beam sweeping is for future study;

Whether or not to use contention-based PRACH as a supplement to contention-free PRACH for transmission of beam failure recovery request is for future study;

Contention-based PRACH resources are selected from a conventional random access channel (RACH) resource pool;

A four-step RACH procedure is used.

Figure 2:
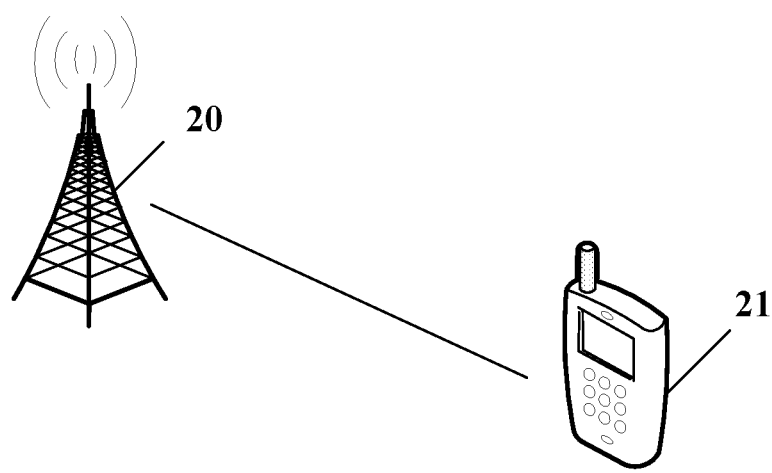
FIG. 2 is a schematic diagram of an architecture of a wireless communication system according to some embodiments of the present disclosure.

The embodiments of the present disclosure are described below with reference to the accompanying drawings. The beam failure recovery method and device provided in some embodiments of the present disclosure may be applied to a wireless communication system. The wireless communication system may be a system using 5G mobile communication technology (referred to as 5G system below) or an evolved Long Term Evolution (eLTE) system or a future evolved communication system. Referring to FIG. 2, FIG. 2 is a schematic diagram of an architecture of a wireless communication system according to some embodiments of the present disclosure. As shown in FIG. 2, the wireless communication system may include a network side device 20 and UE. For example, the UE is denoted as UE 21. The UE 21 may communicate with the network side device 20. During actual application, the connection between foregoing devices may be a wireless connection. To illustrate connection relationships between the devices easily and intuitively, solid lines are used to represent the connection relationships in FIG. 2.

It needs to be noted that the communication system may include a plurality of UEs. The network side device may communicate with the plurality of UEs (signaling or data transmission).

The network side device provided in some embodiments of the present disclosure may be a base station. The network side device may be a commonly used base station or may be an evolved node base station (eNB) or may be a device in a 5G system such as a network side device (for example, a gNB) or a transmission and reception point (TRP).

The UE provided in some embodiments of the present disclosure may be a mobile phone, a tablet computer, a notebook computer, an ultra-mobile personal computer (UMPC), a netbook, a personal digital assistant (PDA) or the like.

Figure 3:
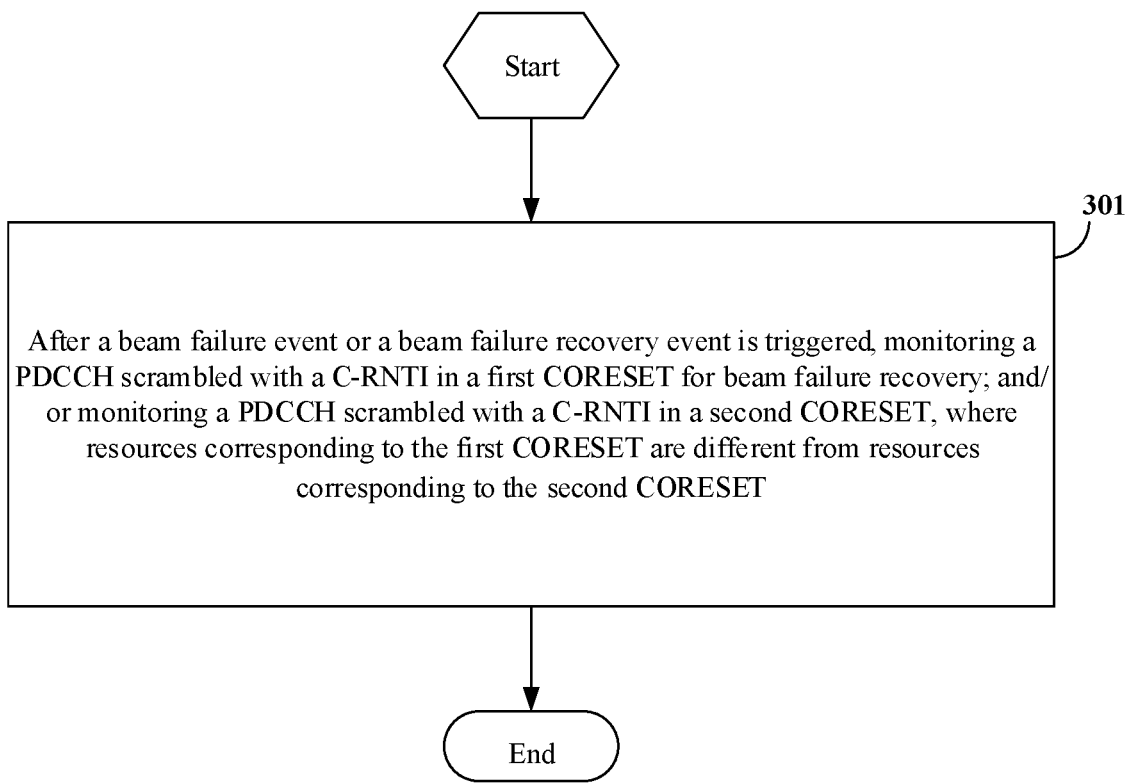
FIG. 3 is a first flowchart of a beam failure recovery method according to some embodiments of the present disclosure.

Referring to FIG. 3, FIG. 3 shows a procedure of a beam failure recovery method according to some embodiments of the present disclosure. The method is performed by UE and has the following specific step.

A step 301 includes: after a beam failure event or a beam failure recovery event is triggered, monitoring a PDCCH scrambled with a C-RNTI in a first CORESET for beam failure recovery; and/or monitoring a PDCCH scrambled with a C-RNTI in a second CORESET.

Resources corresponding to the first CORESET are different from resources corresponding to the second CORESET.

It needs to be noted that the beam failure event may also be referred to as beam failure, and the beam failure recovery event may also be referred to as beam failure recovery.

In some embodiments of the present disclosure, the first CORESET may be referred to as a CORESET of preset resources corresponding to beam failure recovery, and the second CORESET may be referred to as a CORESET corresponding to resources other than the preset resources. The preset resources include: some or all candidate beams, or RS resources corresponding to candidate beams, or candidate RS resources.

In some embodiments of the present disclosure, optionally, the method further includes: stopping monitoring a PDCCH scrambled with a C-RNTI in the second CORESET when a C-RNTI is monitored in the first CORESET; or stopping monitoring a PDCCH scrambled with a C-RNTI in the first CORESET when a C-RNTI is monitored in the second CORESET.

In some embodiments of the present disclosure, optionally, the resources corresponding to the first CORESET include at least one of:

all candidate beams;
RS resources corresponding to all candidate beams; some candidate beams;
RS resources corresponding to some candidate beams;
a candidate RS resource; or
a candidate RS resource corresponding to a candidate beam.

In some embodiments of the present disclosure, optionally, before the step 301, the method further includes: indicating, by a media access control (MAC) layer, a beam failure indication to a physical (PHY) layer.

In some embodiments of the present disclosure, optionally, before the step 301, the method further includes: transmitting a random access preamble to a network side device by using a random access procedure, where the random access preamble is used as a beam failure recovery request; or indicating, by a PHY layer, a candidate beam or a resource corresponding to a candidate beam or a candidate resource to an MAC layer, where the resource includes an RS resource or candidate RS resource.

In some embodiments of the present disclosure, optionally, before the transmitting a random access preamble to the network side device by using a random access procedure or before the indicating, by the PHY layer, the candidate beam or the resource corresponding to the candidate beam or the candidate resource to the MAC layer, the method further includes at least one of: stopping a beam failure recovery timer; stopping a beam failure recovery request transmission counter; or stopping transmitting a random access preamble to the network side device.

In some embodiments of the present disclosure, optionally, after the transmitting a random access preamble to the network side device by using a random access procedure so as to transmit a beam failure recovery request or after the indicating, by the PHY layer, the candidate beam or the resource corresponding to the candidate beam or the candidate resource to the MAC layer, the method further includes at least one of: stopping a beam failure recovery timer; stopping a beam failure recovery request transmission counter; stopping transmitting a random access preamble to the network side device; or indicating to the network side device that beam failure recovery succeeds.

In some embodiments of the present disclosure, optionally, in the step 301, when a C-RNTI is monitored in the second CORESET, the method further includes at least one of: continuing a beam failure recovery procedure; continuing a random access procedure in a beam failure recovery procedure; or indicating, by a PHY layer, a new candidate beam or candidate RS resource to an MAC layer.

The new candidate beam is a beam in the second CORESET in which a C-RNTI is monitored; or the new candidate RS resource is an RS resource in the second CORESET in which a C-RNTI is monitored.

In some embodiments of the present disclosure, optionally, when indicating by the PHY layer to the higher layer, the method further includes at least one of: stopping a beam failure recovery procedure; or stopping a random access procedure in a beam failure recovery procedure.

In some embodiments of the present disclosure, optionally, in the step 301, when a C-RNTI is monitored in the first CORESET, the method further includes at least one of:
stopping a beam failure recovery procedure;
stopping a random access procedure in a beam failure recovery procedure;
determining that beam failure recovery succeeds;
indicating, by an MAC layer to a higher layer and/or a PHY layer, that beam failure recovery succeeds;
stopping a beam failure recovery timer;
stopping a beam failure recovery request transmission counter; or
stopping transmitting a random access preamble to a network side device.

Figure 4:
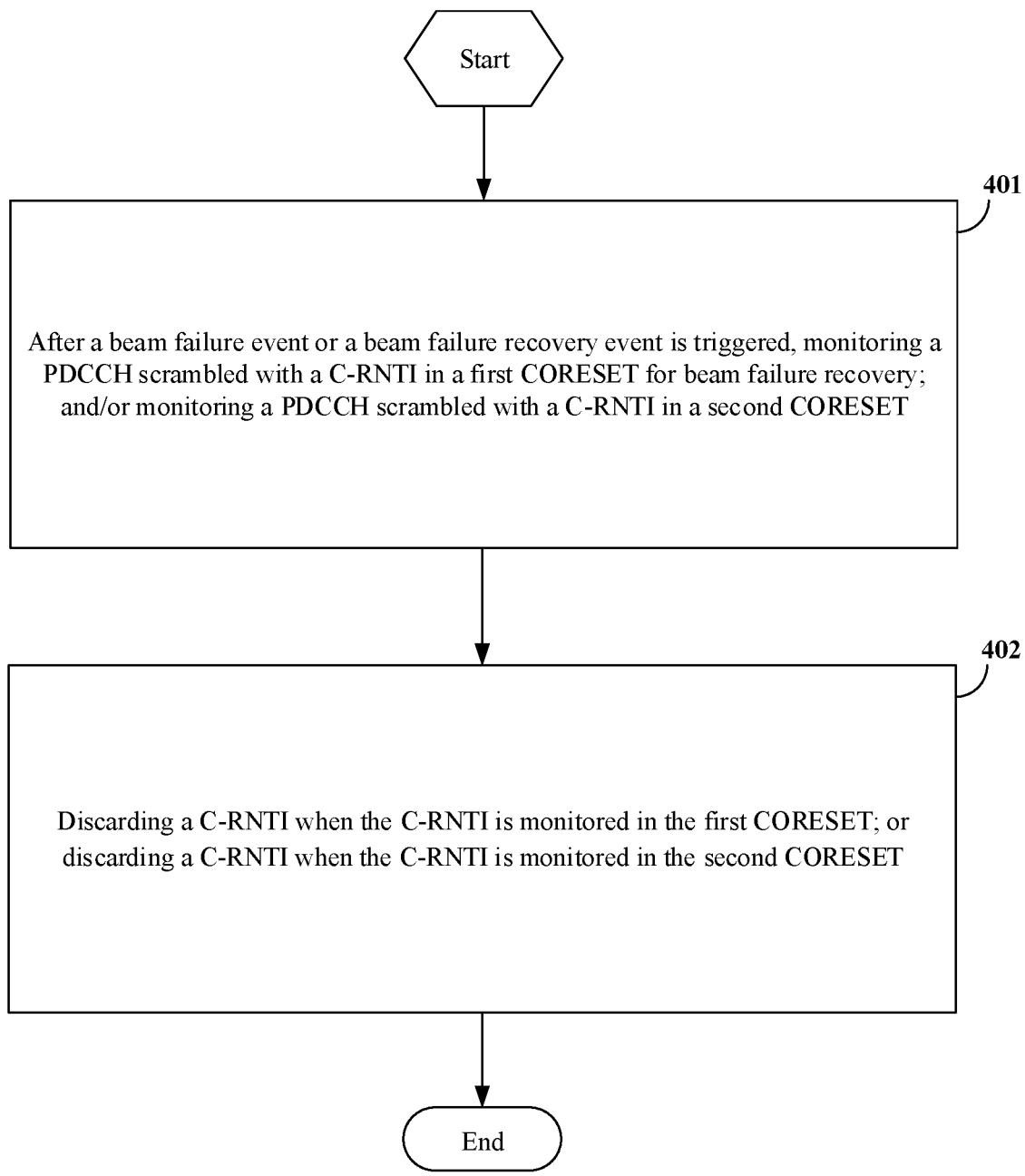
FIG. 4 is a second flowchart of a beam failure recovery method according to some embodiments of the present disclosure.

Referring to FIG. 4, FIG. 4 shows a procedure of a beam failure recovery method according to some embodiments of the present disclosure. The method is performed by UE and includes the following specific steps.

A step 401 includes: after a beam failure event or a beam failure recovery event is triggered, monitoring a PDCCH scrambled with a C-RNTI in a first CORESET for beam failure recovery; and/or monitoring a PDCCH scrambled with a C-RNTI in a second CORESET.

Resources corresponding to the first CORESET are different from resources corresponding to the second CORESET.

A step 402 includes: discarding a C-RNTI when the C-RNTI is monitored in the first CORESET, and continuing monitoring a C-RNTI in the second CORESET; or discarding a C-RNTI when the C-RNTI is monitored in the second CORESET, and continuing monitoring a C-RNTI in the first CORESET.

In some embodiments of the present disclosure, optionally, the method further includes: stopping monitoring a PDCCH scrambled with a C-RNTI in the second CORESET when a C-RNTI is monitored in the first CORESET; or stopping monitoring a PDCCH scrambled with a C-RNTI in the first CORESET when a C-RNTI is monitored in the second CORESET.

In some embodiments of the present disclosure, optionally, the resources corresponding to the first CORESET include at least one of:
all candidate beams;
RS resources corresponding to all candidate beams; some candidate beams;
RS resources corresponding to some candidate beams;
a candidate RS resource; or
a candidate RS resource corresponding to a candidate beam.

In some embodiments of the present disclosure, optionally, before the step 401, the method further includes: indicating, by an MAC layer, a beam failure indication to a PHY layer.

In some embodiments of the present disclosure, optionally, before the step 401, the method further includes: transmitting a random access preamble to a network side device by using a random access procedure, where the random access preamble is used as a beam failure recovery request; or indicating, by a PHY layer, a candidate beam or a resource corresponding to a candidate beam or a candidate resource to an MAC layer, where the resource includes an RS resource or candidate RS resource.

In some embodiments of the present disclosure, optionally, before the transmitting a random access preamble to the network side device by using a random access procedure or before the indicating, by the PHY layer, the candidate beam or the resource corresponding to the candidate beam or the candidate resource to the MAC layer, the method further includes at least one of: stopping a beam failure recovery timer; stopping a beam failure recovery request transmission counter; or stopping transmitting a random access preamble to the network side device.

In some embodiments of the present disclosure, optionally, after the transmitting a random access preamble to the network side device by using a random access procedure so as to transmit a beam failure recovery request or after the indicating, by the PHY layer, the candidate beam or the resource corresponding to the candidate beam or the candidate resource to the MAC layer, the method further includes at least one of: stopping a beam failure recovery timer; stopping a beam failure recovery request transmission counter; stopping transmitting a random access preamble to the network side device; or indicating to the network side device that beam failure recovery succeeds.

In some embodiments of the present disclosure, optionally, in the step 401, when a C-RNTI is monitored in the second CORESET, the method further includes at least one of: continuing a beam failure recovery procedure; continuing a random access procedure in a beam failure recovery procedure; or indicating, by a PHY layer, a new candidate beam or candidate RS resource to an MAC layer.

The new candidate beam is a beam in the second CORESET in which a C-RNTI is monitored; or the new candidate RS resource is an RS resource in the second CORESET in which a C-RNTI is monitored.

In some embodiments of the present disclosure, optionally, when indicating by the PHY layer to the higher layer, the method further includes at least one of: stopping a beam failure recovery procedure; or stopping a random access procedure in a beam failure recovery procedure.

In some embodiments of the present disclosure, optionally, in the step 401, when a C-RNTI is monitored in the first CORESET, the method further includes at least one of:
  stopping a beam failure recovery procedure;
  stopping a random access procedure in a beam failure recovery procedure;
  determining that beam failure recovery succeeds;
  indicating, by an MAC layer to a higher layer and/or a PHY layer, that beam failure recovery succeeds;
  stopping a beam failure recovery timer;
  stopping a beam failure recovery request transmission counter; or
  stopping transmitting a random access preamble to a network side device.

Figure 5:
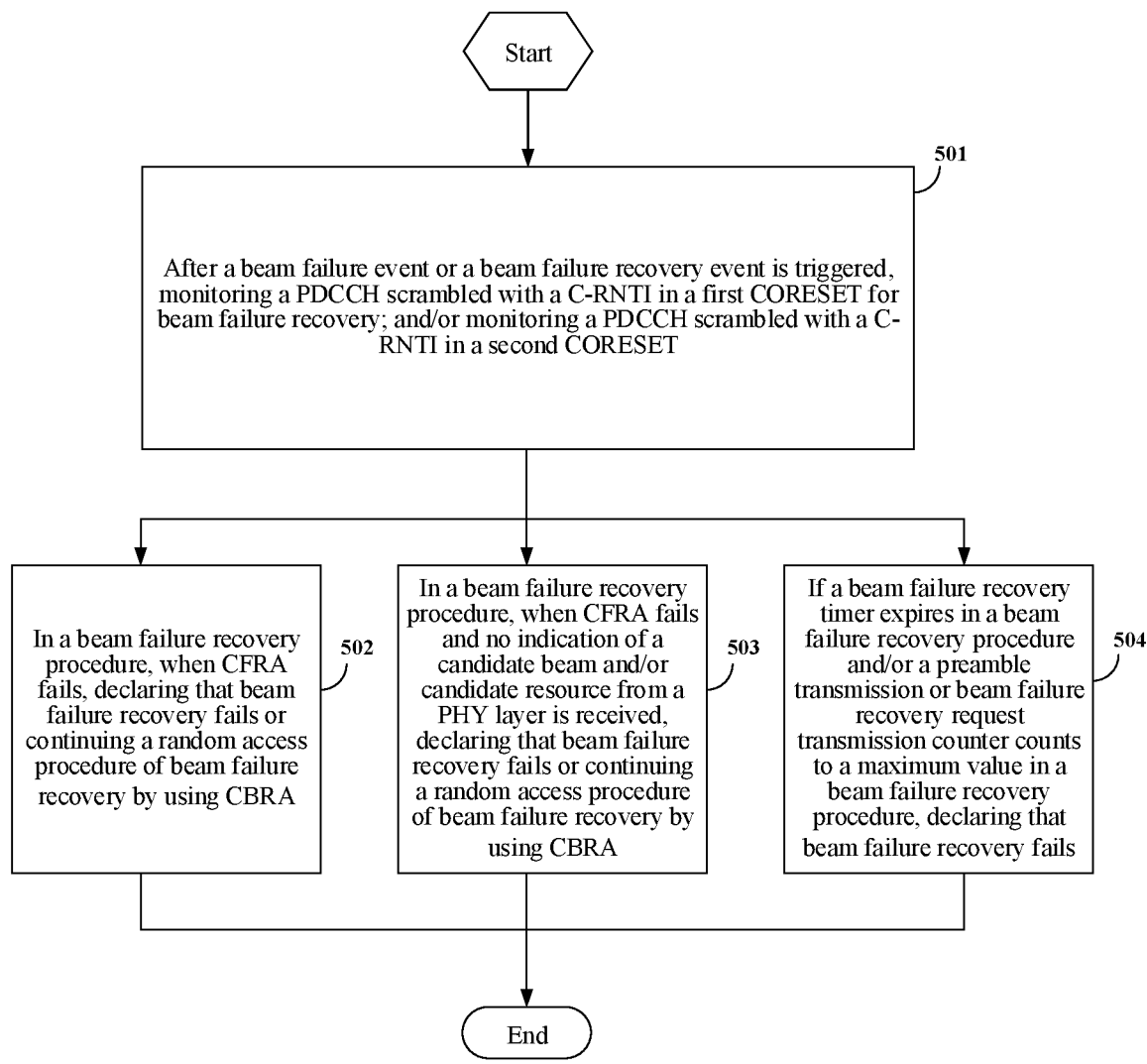
FIG. 5 is a third flowchart of a beam failure recovery method according to some embodiments of the present disclosure.

Referring to FIG. 5, FIG. 5 shows a procedure of a beam failure recovery method according to some embodiments of the present disclosure. The method is performed by UE and includes the following specific steps.

A step 501 includes: after a beam failure event or a beam failure recovery event is triggered, monitoring a PDCCH scrambled with a C-RNTI in a first CORESET for beam failure recovery; and/or monitoring a PDCCH scrambled with a C-RNTI in a second CORESET.

Resources corresponding to the first CORESET are different from resources corresponding to the second CORESET.

A step 502 includes: in a beam failure recovery procedure, when contention-free random access (CFRA) fails, declaring that beam failure recovery fails or continuing a random access procedure of beam failure recovery by using contention-based random access (CBRA).

A step 503 includes: in a beam failure recovery procedure, when CFRA fails and no indication of a candidate beam and/or candidate resource from a PHY layer is received, declaring that beam failure recovery fails or continuing a random access procedure of beam failure recovery by using CBRA.

A step 504 includes: if a beam failure recovery timer expires in a beam failure recovery procedure and/or a preamble transmission or beam failure recovery request transmission counter counts to a maximum value in a beam failure recovery procedure, declaring that beam failure recovery fails.

It needs to be noted that the execution order of steps 501, 502, 503, and 504 is not limited in some embodiments of the present disclosure.

In some embodiments of the present disclosure, optionally, after it is determined that beam failure recovery fails and/or an indication of a candidate beam and/or candidate resource from a PHY layer is received, the method further includes starting at least one of:
  a beam failure recovery timer;
  a beam failure recovery request transmission counter;
  a CFRA-based beam failure recovery timer;
  a CFRA-based beam failure recovery request transmission counter;
  a CBRA-based beam failure recovery timer; or
  a CBRA-based beam failure recovery request transmission counter.

In some embodiments of the present disclosure, optionally, the method further includes:
  in the process of continuing a random access procedure of beam failure recovery by using CBRA, if a CBRA timer expires, and/or a CBRA preamble transmission or beam failure recovery request transmission counter counts to a maximum value, declaring that beam failure recovery fails.

In some embodiments of the present disclosure, optionally, the method further includes:
  when a C-RNTI is monitored in the first CORESET or the second CORESET before a beam failure recovery timer expires, determining that beam failure recovery succeeds; and/or
  when a C-RNTI is monitored in the first CORESET or the second CORESET before a preamble transmission counter or a beam failure recovery request transmission counter counts to a maximum value during beam failure recovery, determining that beam failure recovery succeeds.

In some embodiments of the present disclosure, optionally, the method further includes: when beam failure recovery fails or beam failure recovery succeeds, indicating, to a PHY layer and/or a higher layer, that beam failure recovery fails or beam failure recovery succeeds.

In some embodiments of the present disclosure, optionally, the method further includes:
  when an MAC layer determines that beam failure recovery succeeds or beam failure recovery fails, indicating, to a radio resource control (RRC) layer, indication information indicating that beam failure recovery succeeds or beam failure recovery fails, where the indication information is used in the RRC layer for instructing the RRC layer to adjust radio link monitoring (RLM).

Example 1: monitoring two C-RNTIs, and possibly discarding one subsequently.

After a beam failure event or a beam failure recovery event is triggered, UE performs at least one of following operations:
  (1) monitoring a PDCCH scrambled with a C-RNTI in a first CORESET for beam failure recovery;
  (2) monitoring a PDCCH scrambled with a C-RNTI in a second CORESET.

Further, before the UE performs the operations (1) and (2), an MAC layer indicates a beam failure indication to a PHY layer. After receiving the indication, the PHY layer then performs the operations (1) and (2).

Further, before the UE performs the operations (1) and (2), the UE transmits at the MAC layer a beam failure recovery request to a base station by using a random access procedure. After transmitting a random access preamble in a random access procedure or indicating, by a PHY layer, a candidate beam or an RS resource corresponding to a candidate beam or a candidate RS resource to the MAC layer, the UE performs the operations (1) and (2).

Further, after the UE performs the operations (1) or (2):
  discarding a C-RNTI when the C-RNTI is monitored in the first CORESET; or
  discarding a C-RNTI when the C-RNTI is monitored in the second CORESET.

Example 2: monitoring two C-RNTIs. Further, refraining from transmitting a preamble to a network side device, or monitoring two C-RNTIs after transmitting the preamble.

After a beam failure event or a beam failure recovery event is triggered, UE performs at least one of following operations:

(1) monitoring a PDCCH scrambled with a C-RNTI in a first CORESET for beam failure recovery;
(2) monitoring a PDCCH scrambled with a C-RNTI in a second CORESET.

Scenario 1: When a C-RNTI is monitored in the second CORESET, UE performs at least one of following operations:

continuing (not stopping) a beam failure recovery procedure;
continuing (not stopping) a random access procedure in a beam failure recovery procedure; or
indicating, by a PHY layer, a new candidate beam or candidate RS resource to an MAC layer.

Further, the new candidate beam is a beam in the second CORESET in which a C-RNTI is monitored; or the new candidate RS resource is an RS resource in the second CORESET in which a C-RNTI is monitored.

Scenario 2: When a C-RNTI is monitored in the second CORESET or when a PHY layer determines that beam failure recovery succeeds in the process of monitoring a C-RNTI in the first CORESET or the second CORESET, UE performs at least one of following operations:

(1) stopping a beam failure recovery procedure, and/or stopping a random access procedure in a beam failure recovery procedure;
(2) indicating, by a PHY layer to a higher layer, that beam failure recovery succeeds.

Further, after the indication from the PHY layer is received by the MAC layer, a beam failure recovery procedure is stopped and/or a random access procedure in a beam failure recovery procedure is stopped.

For the foregoing operations (1) and (2), before transmitting a random access preamble to the network side device by using a random access procedure or before indicating, by the PHY layer, the candidate beam or the resource corresponding to the candidate beam or the candidate resource to the MAC layer, UE performs at least one of following operations:

stopping a beam failure recovery timer;
stopping a beam failure recovery request transmission counter; or
stopping transmitting a random access preamble to the network side device.

For operations (1) and (2), after transmitting a random access preamble to the network side device by using a random access procedure so as to transmit a beam failure recovery request; or after indicating, by the PHY layer, the candidate beam or the resource corresponding to the candidate beam or the candidate resource to the MAC layer, UE performs at least one of following operations:

stopping a beam failure recovery timer;
stopping a beam failure recovery request transmission counter;
stopping transmitting a random access preamble to the network side device; or
indicating to the network side device that beam failure recovery succeeds.

Scenario 3: When a C-RNTI is monitored in the first CORESET, UE performs at least one of following operations:

stopping a beam failure recovery procedure;
stopping a random access procedure in a beam failure recovery procedure;
determining that beam failure recovery succeeds;
indicating, by an MAC layer to a higher layer and/or a PHY layer, that beam failure recovery succeeds;
stopping a beam failure recovery timer;
stopping a beam failure recovery request transmission counter; or
stopping transmitting a random access preamble to a network side device.

Example 3

In a RACH procedure in a beam failure recovery procedure, UE performs at least one of following operations:

(1) When CFRA fails, the UE directly declares that beam failure recovery fails, or continues a random access procedure of beam failure recovery by using CBRA.

That the CFRA fails includes: a CFRA timer expires and/or a CFRA counter counts to a maximum value. That is, in the process of continuing a random access procedure of beam failure recovery by using CBRA, if a CBRA timer expires and/or a CBRA counter counts to a maximum value, UE directly declares that beam failure recovery fails.

(2) When CFRA fails and no indication of a candidate beam and/or candidate resource from a PHY layer is received, the UE declares that beam failure recovery fails or continues a random access procedure of beam failure recovery by using CBRA.

(3) If a beam failure recovery timer expires in a beam failure recovery procedure and/or a preamble transmission or beam failure recovery request transmission counter counts to a maximum value in a beam failure recovery procedure, the UE directly declares that beam failure recovery fails.

Further, after beam failure recovery fails or succeeds as in the foregoing operations (1), (2), and (3), the PHY layer and/or the higher layer is informed.

Example 4

In all the Example 1, Example 2, and Example 3, after determining that beam failure recovery succeeds or fails, the MAC layer indicates, to an RRC layer, that beam failure recovery succeeds or fails. The RRC layer adjusts the RLM according to the indication.

After obtaining the indication that beam failure recovery succeeds indicated by the MAC layer, or indicated by the MAC layer through the PHY layer, the RRC layer uses this indication as an in-sync indication, or if a T310 timer is running, the timer is stopped or the timer is restarted.

After obtaining the indication that beam failure recovery fails indicated by the MAC layer, or indicated by the MAC layer through the PHY layer, the RRC layer uses this indication as an out-of-sync indication or triggers a radio link failure or starts the T310 timer.

Figure 6:
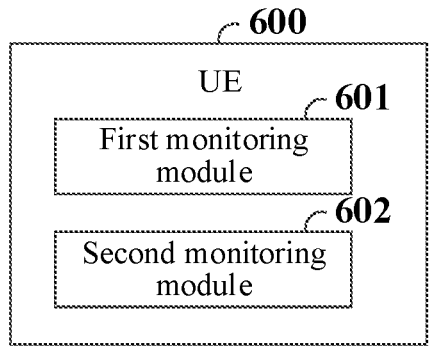
FIG. 6 is a first schematic structural diagram of UE according to some embodiments of the present disclosure.

Referring to FIG. 6, the present disclosure provides in some embodiments UE 600, including:

a first monitoring module 601, configured to: after a beam failure event or a beam failure recovery event is triggered, monitor a PDCCH scrambled with a C-RNTI in a first CORESET for beam failure recovery; and/or
a second monitoring module 602, configured to: after a beam failure event or a beam failure recovery event is triggered, monitor a PDCCH scrambled with a C-RNTI in a second CORESET, where resources corresponding to the first CORESET are different from resources corresponding to the second CORESET.

Figure 7:
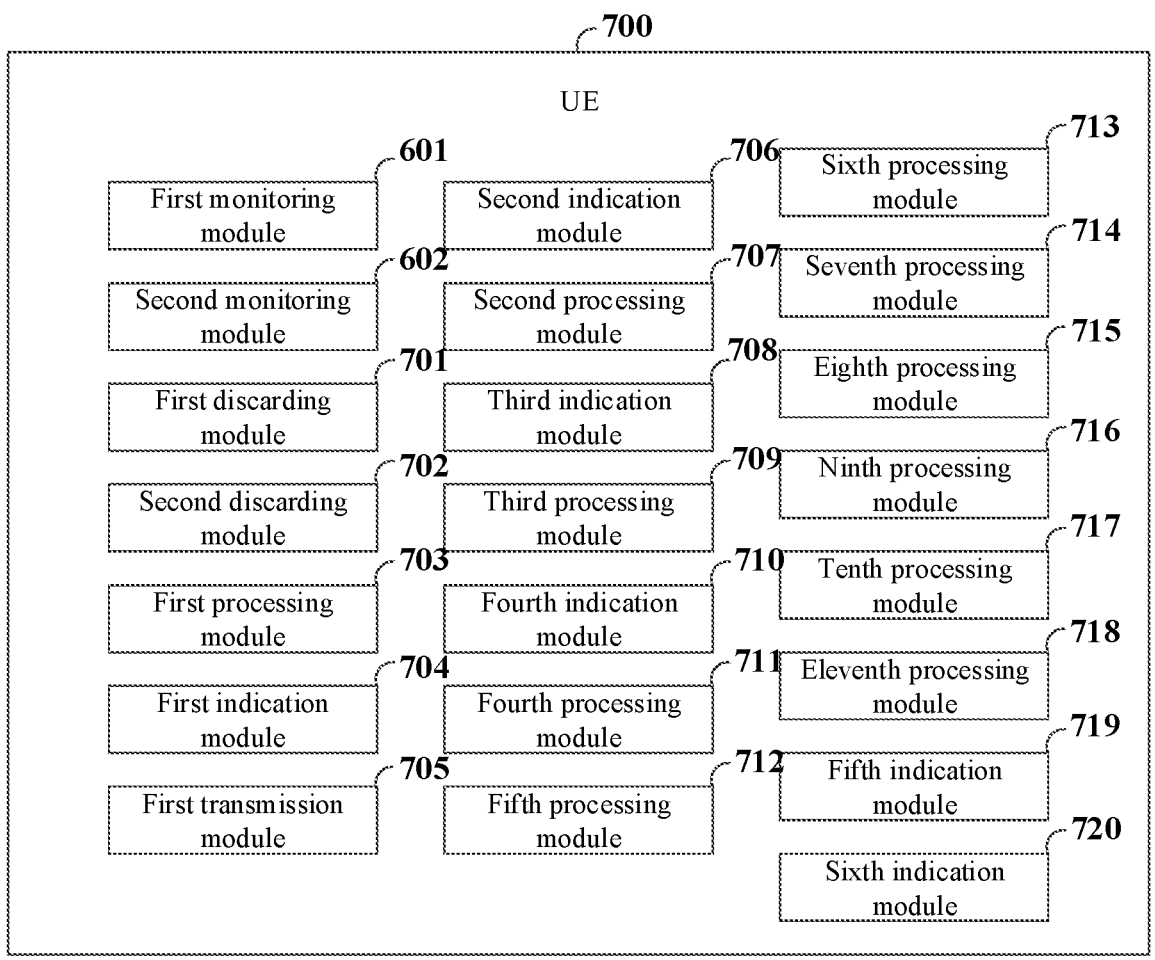
FIG. 7 is a second schematic structural diagram of UE according to some embodiments of the present disclosure.

Referring to FIG. 7, the present disclosure provides in some embodiments another UE 700, including:
a first monitoring module 601, configured to: after a beam failure event or a beam failure recovery event is triggered, monitor a PDCCH scrambled with a C-RNTI in a first CORESET for beam failure recovery; and/or
a second monitoring module 602, configured to: after a beam failure event or a beam failure recovery event is triggered, monitor a PDCCH scrambled with a C-RNTI in a second CORESET,
where resources corresponding to the first CORESET are different from resources corresponding to the second CORESET.

Optionally, the UE 700 further includes:
a first discarding module 701, configured to: discard a C-RNTI when the C-RNTI is monitored in the first CORESET, and continue monitoring a C-RNTI in the second CORESET; and/or
a second discarding module 702, configured to: discard a C-RNTI when the C-RNTI is monitored in the second CORESET, and continue monitoring a C-RNTI in the first CORESET.

Optionally, the UE 700 further includes:
a first processing module 703, configured to: stop monitoring a PDCCH scrambled with a C-RNTI in the second CORESET when a C-RNTI is monitored in the first CORESET; or
stop monitoring a PDCCH scrambled with a C-RNTI in the first CORESET when a C-RNTI is monitored in the second CORESET.

Further, the resources corresponding to the first CORESET include at least one of: all candidate beams; RS resources corresponding to all candidate beams; some candidate beams; RS resources corresponding to some candidate beams; a candidate RS resource; or a candidate RS resource corresponding to a candidate beam.

Optionally, the UE 700 further includes:
a first indication module 704, configured to indicate, by an MAC layer, a beam failure indication to a PHY layer.

Optionally, the UE 700 further includes:
a first transmission module 705, configured to: transmit a random access preamble to a network side device by using a random access procedure, where the random access preamble is used as a beam failure recovery request; or
a second indication module 706, configured to indicate, by a PHY layer, a candidate beam or a resource corresponding to a candidate beam or a candidate resource to an MAC layer, where the resource includes an RS resource or candidate RS resource.

Optionally, the UE 700 further includes:
a second processing module 707, configured to: when a C-RNTI is monitored in the second CORESET, continue a beam failure recovery procedure; and/or continue a random access procedure in a beam failure recovery procedure; and/or
a third indication module 708, configured to: when a C-RNTI is monitored in the second CORESET, indicate, by a PHY layer, a new candidate beam or candidate RS resource to an MAC layer.

Further, the new candidate beam is a beam in the second CORESET in which a C-RNTI is monitored; or the new candidate RS resource is an RS resource in the second CORESET in which a C-RNTI is monitored.

Optionally, the UE 700 further includes:
a third processing module 709, configured to: when a C-RNTI is monitored in the second CORESET or when a PHY layer determines that beam failure recovery succeeds in the process of monitoring a C-RNTI in the first CORESET or the second CORESET, stop a beam failure recovery procedure; and/or stop a random access procedure in a beam failure recovery procedure; and/or
a fourth indication module 710, configured to: after the UE monitors the C-RNTI or the PHY layer determines that beam failure recovery succeeds, indicate, by the PHY layer to a higher layer, that beam failure recovery succeeds.

Optionally, the UE 700 further includes:
a fourth processing module 711, configured to: after the higher layer receives the indication from the PHY layer, stop a beam failure recovery procedure, and/or stop a random access procedure in a beam failure recovery procedure.

Optionally, the UE 700 further includes:
a fifth processing module 712, configured to: before transmitting a random access preamble to the network side device by using a random access procedure or before indicating, by the PHY layer, the candidate beam or the resource corresponding to the candidate beam or the candidate resource to the MAC layer, perform at least one of: stopping a beam failure recovery timer; stopping a beam failure recovery request transmission counter; or stopping transmitting a random access preamble to the network side device.

Optionally, the UE 700 further includes:
a sixth processing module 713, configured to: after transmitting a random access preamble to the network side device by using a random access procedure so as to transmit a beam failure recovery request or after indicating, by the PHY layer, the candidate beam or the resource corresponding to the candidate beam or the candidate resource to the MAC layer, perform at least one of: stopping a beam failure recovery timer; stopping a beam failure recovery request transmission counter; stopping transmitting a random access preamble to the network side device; or indicating to the network side device that beam failure recovery succeeds.

Optionally, the UE 700 further includes:
a seventh processing module 714, configured to: when a beam failure recovery procedure is stopped and/or a random access procedure in a beam failure recovery procedure is stopped when a C-RNTI is monitored in the first CORESET, perform at least one of: determining that beam failure recovery succeeds; indicating, by an MAC layer to a higher layer and/or a PHY layer, that beam failure recovery succeeds; stopping a beam failure recovery timer; stopping a beam failure recovery request transmission counter; or stopping transmitting a random access preamble to the network side device.

Optionally, in a beam failure recovery procedure, the UE 700 further includes:
an eighth processing module 715, configured to: when it is determined that CFRA fails, declare that beam failure recovery fails or continue a random access procedure of beam failure recovery by using CBRA; or
when it is determined that CFRA fails and no indication of a candidate beam and/or candidate resource from a PHY layer is received, declare that beam failure recovery fails or continue a random access procedure of beam failure recovery by using CBRA; or if a beam failure recovery timer expires in a beam failure recovery procedure and/or a preamble transmission or beam failure recovery request transmission counter counts to a maximum value in a beam failure recovery procedure, declare that beam failure recovery fails.

Optionally, the UE 700 further includes:

a ninth processing module 716, configured to: after a beam failure event is triggered and/or an indication of a candidate beam and/or candidate resource from a PHY layer is received, start at least one of: a beam failure recovery timer; a beam failure recovery request transmission counter; a CFRA-based beam failure recovery timer; a CFRA-based beam failure recovery request transmission counter; a CBRA-based beam failure recovery timer; or a CBRA-based beam failure recovery request transmission counter.

Optionally, the UE 700 further includes:

a tenth processing module 717, configured to: in the process of continuing a random access procedure of beam failure recovery by using CBRA, if a CBRA timer expires, and/or a CBRA preamble transmission or beam failure recovery request transmission counter counts to a maximum value, declare that beam failure recovery fails.

Optionally, the UE 700 further includes:

an eleventh processing module 718, configured to: when a C-RNTI is monitored in the first CORESET or the second CORESET before a beam failure recovery timer expires, determine that beam failure recovery succeeds; and/or when a C-RNTI is monitored in the first CORESET or the second CORESET before a preamble transmission counter or a beam failure recovery request transmission counter counts to a maximum value during beam failure recovery, determine that beam failure recovery succeeds.

Optionally, the UE 700 further includes:

a fifth indication module 719, configured to: when beam failure recovery fails or beam failure recovery succeeds, indicate, to a PHY layer and/or a higher layer, that beam failure recovery fails or beam failure recovery succeeds.

Optionally, the UE 700 further includes:

a sixth indication module 720, configured to: when an MAC layer determines that beam failure recovery succeeds or beam failure recovery fails, indicate, to an RRC layer, indication information indicating that beam failure recovery succeeds or beam failure recovery fails, where the indication information is used in the RRC layer for instructing the RRC layer to adjust RLM.

Figure 8:
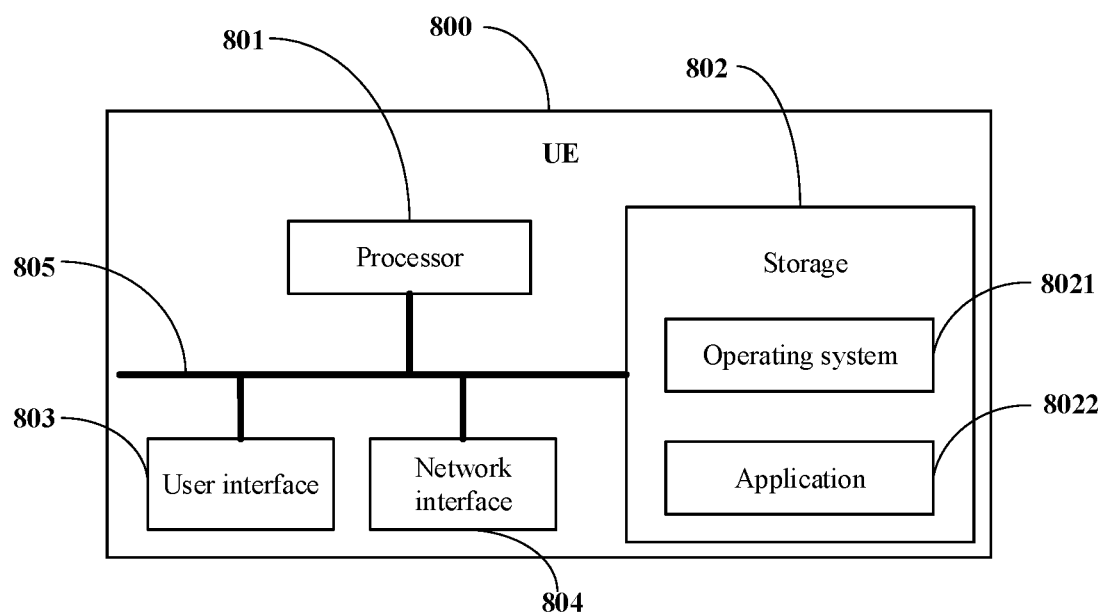
FIG. 8 is a third schematic structural diagram of UE according to some embodiments of the present disclosure.

Referring to FIG. 8, the present disclosure provides in some embodiments another UE 800, including: at least one processor 801, a storage 802, a user interface 803, and at least one network interface 804. The various components in the UE 800 are coupled together by a bus system 805.

It may be understood that the bus system 805 is configured to implement connection and communication among these components. The bus system 805 further includes a power bus, a control bus, and a status signal bus in addition to a data bus. However, for clarity, various buses in FIG. 8 are all shown as the bus system 805.

The user interface 803 may include a display, a keyboard or a point-and-click device (for example, a mouse, a trackball, a touch panel, a touch screen or the like).

It may be understood that the storage 802 in some embodiments of the present disclosure may be a volatile storage or a nonvolatile storage or may include both a volatile storage and a nonvolatile storage. The nonvolatile storage may be a read-only memory (ROM), a programmable ROM (PROM), an erasable programmable PROM (EPROM), an electrically EPROM (EEPROM) or a flash memory. The volatile storage may be a random access memory (RAM), which is used as an external cache. By way of example rather than limitation, many forms of RAMs such as a static RAM (SRAM), a dynamic RAM (DRAM), a synchronous DRAM (SDRAM), a double-data-rate SDRAM (DDRSDRAM), an enhanced SDRAM (ES-DRAM), a Synchlink DRAM (SLDRAM), and a Direct Rambus RAM (DRRAM) may be used. The storage 802 described in some embodiments of the present disclosure is intended to include, but is not limited to, these and any other suitable types of storages.

In some implementations, the storage 802 stores the following elements, executable modules or data structures or a subset thereof, or an extended set thereof: an operating system (OS) 8021 and an application 8022.

The operating system 8021 includes various system programs such as a framework layer, a core library layer, and a driver layer, and is configured to implement various basic services and process hardware-based tasks. The application 8022 includes various applications such as a media player or a browser, and is configured to implement various application services. A program for implementing the method provided in some embodiments of the present disclosure may be included in the application 8022.

In some embodiments of the present disclosure, the UE 800 further includes a computer program stored in the storage 802 and configured to be executed by the processor 801. The processor 801 is configured to execute the computer program to implement the steps of the method provided in some embodiments of the present disclosure.

The foregoing method disclosed in some embodiments of the present disclosure may be applied to the processor 801 or implemented by the processor 801. The processor 801 may be an integrated circuit chip having a signal processing capability. During implementation, the steps in the foregoing method may be accomplished by hardware integrated logic circuits or instructions in a software form in the processor 801. The processor 801 may be a general-purpose processor, a digital signal processor (DSP), an application-specific integrated circuit (ASIC), a field-programmable gate array (FPGA) or another programmable logic device, discrete gate or transistor logic device, a discrete hardware component, that can implement or execute the methods, steps, and logic block diagrams disclosed in some embodiments of the present disclosure. The general-purpose processor may be a microprocessor or the processor may be any conventional processor or the like. The steps in the method disclosed with reference to some embodiments of the present disclosure may be directly performed and accomplished by a hardware decoding processor or performed and accomplished by a combination of hardware and software modules in a decoding processor. The software modules may be located in a computer-readable storage medium well-known in the art, such as a RAM, a flash memory, a ROM, a PROM or an electrically erasable programmable memory or a register. A computer-readable storage medium is located in the storage 802. The processor 801 reads information in the storage 802 and accomplishes the steps in the foregoing method in combination with hardware of the processor. Specifically, the computer-readable storage medium stores a computer program.

It may be understood that these embodiments described in this disclosure may be implemented by using hardware, software, firmware, middleware, microcode or a combination thereof. For hardware implementation, a processing unit may be implemented in one or more of an ASIC, a DSP, a DSP device (DSPD), a programmable logic device (PLD), an FPGA, a general-purpose processor, a controller, a microcontroller, a microprocessor, another electronic unit configured to perform the functions in the present application or a combination thereof For software implementation, the techniques in some embodiments of the present disclosure may be implemented by using modules (for example, processes or functions) that perform the functions in some embodiments of the present disclosure. Software code may be stored in a storage and executed by a processor. The storage may be implemented internal or external to the processor.

The steps of the methods or algorithms described in the disclosed content of the present disclosure may be implemented in the form of hardware or may be implemented in the form of software instructions executed by a processor. The software instructions may be formed by corresponding software modules. The software modules may be stored in a RAM, a flash memory, a ROM, an EPROM, an EEPROM, a register, a hard disk, a removable disk, a CD-ROM or any other form of storage medium known to persons skilled in the art. An exemplary storage medium is coupled to the processor, so that the processor can read information from the storage medium and can write information into the storage medium. Certainly, the storage medium may alternatively be a part of the processor. The processor and the storage medium may be located in the ASIC. In addition, the ASIC may be located in a core network interface device. Certainly, the processor and the storage medium may also reside in the core network interface device as discrete components.

Persons skilled in the art should be aware that in one or more examples in the foregoing description, the functions described in the present disclosure may be implemented by using hardware, software, firmware or any combination thereof. When software is used for implementation, these functions may be stored in a computer-readable medium or transmitted as one or more instructions or codes in the computer-readable medium. The computer-readable medium includes a computer storage medium and a communication medium. The communication medium includes any medium facilitating the transfer of a computer program from one place to another place. The storage medium may be any available medium accessible to a general-purpose or special-purpose computer.

In the foregoing specific implementations, the objectives, technical solutions, and benefits of the present disclosure are described in detail. It should be understood that the foregoing descriptions are merely specific implementations of the present disclosure, and are not intended to limit the scope of the present disclosure. Any modification, equivalent replacement, or improvement made based on the technical solution of the present disclosure should fall within the scope of the present disclosure.

Persons skilled in the art should understand that some embodiments of the present disclosure may be provided as a method, a system or a computer program product. Therefore, some embodiments of the present disclosure may adopt the form of hardware only embodiments, software only embodiments, or embodiments combining software and hardware. Moreover, some embodiments of the present disclosure may adopt the form of a computer program product implemented on one or more computer-usable storage media (including but not limited to a disk storage, a compact disc read-only memory (CD-ROM), an optical storage or the like) including computer usable program code.

Some embodiments of the present disclosure are described with reference to the flowcharts and/or block diagrams of the method, device (system), and computer program product according to some embodiments of the present disclosure. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a special-purpose computer, an embedded processor or a processor of other programmable data processing device to generate a machine, so that the instructions executed by a computer or a processor of other programmable data processing device generate an apparatus for implementing a specific function in one or more processes in the flowcharts and/or in one or more blocks in the block diagrams.

These computer program instructions may also be stored in a computer-readable storage that can instruct the computer or other programmable data processing device to work in a specific manner, so that the instructions stored in the computer-readable storage generate an artifact that includes an instruction apparatus. The instruction apparatus implements a specific function in one or more processes in the flowcharts and/or in one or more blocks in the block diagrams.

These computer program instructions may also be loaded onto a computer or other programmable data processing device, so that a series of operations and steps are performed on the computer or other programmable device, thereby generating computer-implemented processing. Therefore, the instructions executed on the computer or other programmable device provide steps for implementing a specific function in one or more processes in the flowcharts and/or in one or more blocks in the block diagrams.

Obviously, persons skilled in the art can make various modifications and variations to some embodiments of the present disclosure without departing from the spirit and scope of the present disclosure. If these modifications and variations to some embodiments of the present disclosure fall within the scope of claims of the present disclosure and equivalents thereof, the present disclosure is also intended to encompass these modifications and variations.

What is claimed is:

1. A beam failure recovery method, comprising:
after a beam failure recovery event is triggered, when a timer is running, user equipment (UE) monitoring a physical downlink control channel (PDCCH) scrambled with a cell radio network temporary identifier (C-RNTI) in a first control channel resource set (CORESET) for beam failure recovery, and monitoring a PDCCH scrambled with a C-RNTI in a second CORESET;
wherein the timer is one of a beam failure recovery timer, a contention-free random access (CFRA)-based beam failure recovery timer or a contention-based random access (CBRA)-based beam failure recovery timer;

wherein the timer starts in response to a beam failure indication being received.

2. The beam failure recovery method according to claim 1, further comprising:
when a media access control (MAC) layer of the UE determines that beam failure recovery fails, transmitting, to a radio resource control (RRC) layer, indication information indicating that beam failure recovery fails, wherein the indication information is used for instructing the RRC layer to trigger a radio link failure.

3. The beam failure recovery method according to claim 1, further comprising:
when a C-RNTI is monitored in the first CORESET before the beam failure recovery timer, the CFRA-based beam failure recovery timer or the CBRA-based beam failure recovery timer expires, determining that beam failure recovery succeeds.

4. The beam failure recovery method according to claim 3, wherein, after the determining that beam failure recovery succeeds, the method further comprises at least one of:
stopping a beam failure recovery timer;
stopping a beam failure recovery request transmission counter;
stopping transmitting a random access preamble to a network side device; or
indicating to the network side device that beam failure recovery succeeds.

5. The beam failure recovery method according to claim 1, wherein, before the monitoring the PDCCH scrambled with the C-RNTI in the first CORESET for beam failure recovery, the method further comprises:
the UE transmitting a random access preamble to a network side device by using a random access procedure, wherein the random access preamble is used as a beam failure recovery request.

6. User equipment (UE), comprising a processor, a storage, and a computer program stored in the storage and configured to be executed by the processor, wherein the processor is configured to execute the computer program to implement following steps:
after a beam failure recovery event is triggered, when a timer is running, monitoring a physical downlink control channel (PDCCH) scrambled with a cell radio network temporary identifier (C-RNTI) in a first control channel resource set (CORESET) for beam failure recovery, and monitoring a PDCCH scrambled with a C-RNTI in a second CORESET;
wherein the timer is one of a beam failure recovery timer, a CFRA-based beam failure recovery timer or a CBRA-based beam failure recovery timer;
wherein the timer starts in response to a beam failure indication being received.

7. The UE according to claim 6, wherein the processor is configured to execute the computer program to further implement following step:
when a media access control (MAC) layer of the UE determines that beam failure recovery fails, transmitting, to a radio resource control (RRC) layer, indication information indicating that beam failure recovery fails, wherein the indication information is used for instructing the RRC layer to trigger a radio link failure.

8. The UE according to claim 6, wherein the processor is configured to execute the computer program to further implement following step:
when a C-RNTI is monitored in the first CORESET before the beam failure recovery timer, the CFRA-based beam failure recovery timer or the CBRA-based beam failure recovery timer expires, determining that beam failure recovery succeeds.

9. The UE according to claim 8, wherein the processor is configured to execute the computer program to further implement following step:
after the determining that beam failure recovery succeeds, performing at least one of:
stopping a beam failure recovery timer;
stopping a beam failure recovery request transmission counter;
stopping transmitting a random access preamble to a network side device; or
indicating to the network side device that beam failure recovery succeeds.

10. The UE according to claim 6, wherein the processor is configured to execute the computer program to further implement following step:
before the monitoring the PDCCH scrambled with the C-RNTI in the first CORESET for beam failure recovery, transmitting a random access preamble to a network side device by using a random access procedure, wherein the random access preamble is used as a beam failure recovery request.

11. A non-transitory computer-readable storage medium, storing therein a computer program, wherein the computer program is configured to be executed by a processor to implement following steps:
after a beam failure recovery event is triggered, when a timer is running, monitoring a physical downlink control channel (PDCCH) scrambled with a cell radio network temporary identifier (C-RNTI) in a first control channel resource set (CORESET) for beam failure recovery, and monitoring a PDCCH scrambled with a C-RNTI in a second CORESET;
wherein the timer is one of a beam failure recovery timer, a CFRA-based beam failure recovery timer or a CBRA-based beam failure recovery timer;
wherein the timer starts in response to a beam failure indication being received.

12. The non-transitory computer-readable storage medium according to claim 11, wherein the computer program is configured to be executed by a processor to further implement following step:
when a media access control (MAC) layer of user equipment (UE) determines that beam failure recovery fails, transmitting, to a radio resource control (RRC) layer, indication information indicating that beam failure recovery fails, wherein the indication information is used for instructing the RRC layer to trigger a radio link failure.

13. The non-transitory computer-readable storage medium according to claim 11, wherein the computer program is configured to be executed by a processor to further implement following step:
when a C-RNTI is monitored in the first CORESET before the beam failure recovery timer, the CFRA-based beam failure recovery timer or the CBRA-based beam failure recovery timer expires, determining that beam failure recovery succeeds.

14. The non-transitory computer-readable storage medium according to claim 13, wherein the computer program is configured to be executed by a processor to further implement following step:
after the determining that beam failure recovery succeeds, performing at least one of:
stopping a beam failure recovery timer;

stopping a beam failure recovery request transmission counter;

stopping transmitting a random access preamble to a network side device; or indicating to the network side device that beam failure recovery succeeds.

15. The non-transitory computer-readable storage medium according to claim 11, wherein the computer program is configured to be executed by a processor to further implement following step:

before the monitoring the PDCCH scrambled with the C-RNTI in the first CORESET for beam failure recovery, transmitting a random access preamble to a network side device by using a random access procedure, wherein the random access preamble is used as a beam failure recovery request.

* * * * *